SCREW TYPE ZERO SPEED MERCURY SWITCH

Filed Sept. 23, 1963 4 Sheets-Sheet 1

INVENTOR.
OTTO HERMANN
BY
Toulmin & Toulmin
ATTORNEYS

INVENTOR.
OTTO HERMANN
BY
Toulmin & Toulmin
ATTORNEYS

Dec. 28, 1965 O. HERMANN 3,226,514

SCREW TYPE ZERO SPEED MERCURY SWITCH

Filed Sept. 23, 1963 4 Sheets-Sheet 3

INVENTOR.
OTTO HERMANN
BY
Toulmin & Toulmin
ATTORNEYS

INVENTOR.
OTTO HERMANN
BY
Toulmin & Toulmin
ATTORNEYS

United States Patent Office 3,226,514

Patented Dec. 28, 1965

3,226,514

SCREW TYPE ZERO SPEED MERCURY SWITCH

Otto Hermann, Cincinnati, Ohio, assignor to The R. K. Le Blond Machine Tool Co., Cincinnati, Ohio, a corporation of Delaware Filed Sept. 23, 1963, Ser. No. 310,599
7 Claims. (Cl. 200—152)

This invention relates to electric switches and is particularly concerned with what might be referred to as a "zero speed" switch in that one switching condition exists when the switch is rotating and another switching condition exists when the switch is at zero speed.

Switches of this general type are known and one form, for example, is shown in my issued Patent No. 3,098,906. The switch according to my patent utilizes mercury as a conductive medium and interrupts the circuit through the switch by breaking the body of mercury into two parts and makes a circuit through the switch by joining the two parts of the body of mercury into one part as a single body.

The switch according to my issued patent, however, requires brushes for effecting electrical connection with the switch from externally thereof so that while the switch rotates it can be connected into a circuit.

Brushes of the nature referred to above riding on slip rings, however, are objectionable in that the brushes are expensive and the slip rings are also expensive and the two will wear and, also, a radio frequency signal will emanate from the switch because of the brushes sliding on the slip rings and this is many times extremely objectionable.

With the foregoing in mind, it is a primary object of the present invention to construct a zero speed switch of the nature referred to in which brushes and slip rings and all other slideable contact members are eliminated.

Still another object of this invention is the provision of a zero speed switch which has long life and which is more economical to construct than zero speed switches according to the prior art.

Still another object of this invention is the provision of a zero speed switch of the nature referred to in which the switch has an external non-rotating part so that the switch can easily be mounted.

Still another object of this invention is the provision of a zero speed switch which can be completely sealed, including the electric wires leading thereto so that absolutely no explosion hazard is created by the switch.

Still another and a particular object of this invention is the provision of a zero speed switch which does not radiate energy electromagnetically at any time.

These and other objects and advantages of this invention will become more apparent upon reference to the following specification taken in connection with the accompanying drawings, in which.

Figures 1, 4:
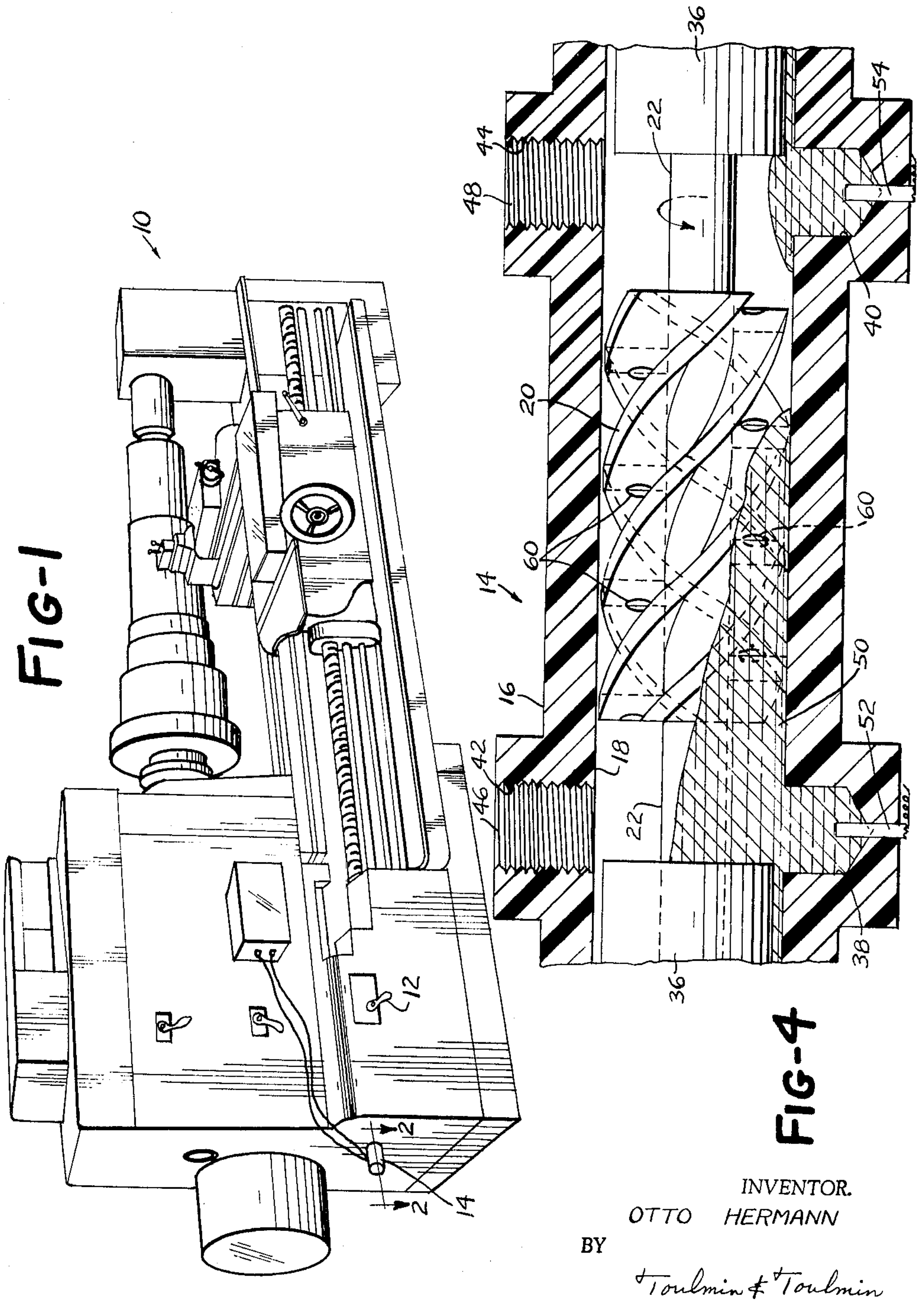
FIGURE 1 is a diagrammatic view of a machine tool having a zero speed switch according to the present invention incorporated therein.
FIGURE 4 is a longitudinal section drawn at enlarged scale through the switch of FIGURES 2 and 3 showing the operation of the switch when rotating.

Referring to the drawings somewhat more in detail, in FIGURE 1 there is shown a lathe at 10 having a shift lock mechanism indicated at 12 which is electrically operable for permitting shifting of the gears and headstock of the lathe and is provided so that the gears can only be shifted when the lathe is stopped.

For determining when the lathe is stopped and for controlling shift lock 12 a zero speed switch 14 is provided, electrically connected with shift lock 12. This switch is connected with a rotary driven member of the lathe so that when the lathe is running, the switch is actuated in rotation and when the lathe is stopped, the switch is stopped.

The switch of the present invention is characterized in that there are no slip rings and no brushes and that all of the making and breaking of the circuit controlled by the switch is effected internally of the switch and electric connection is made to the interior of the switch without any brushes, slip rings or other sliding contacts.

Figures 2, 3, 6:
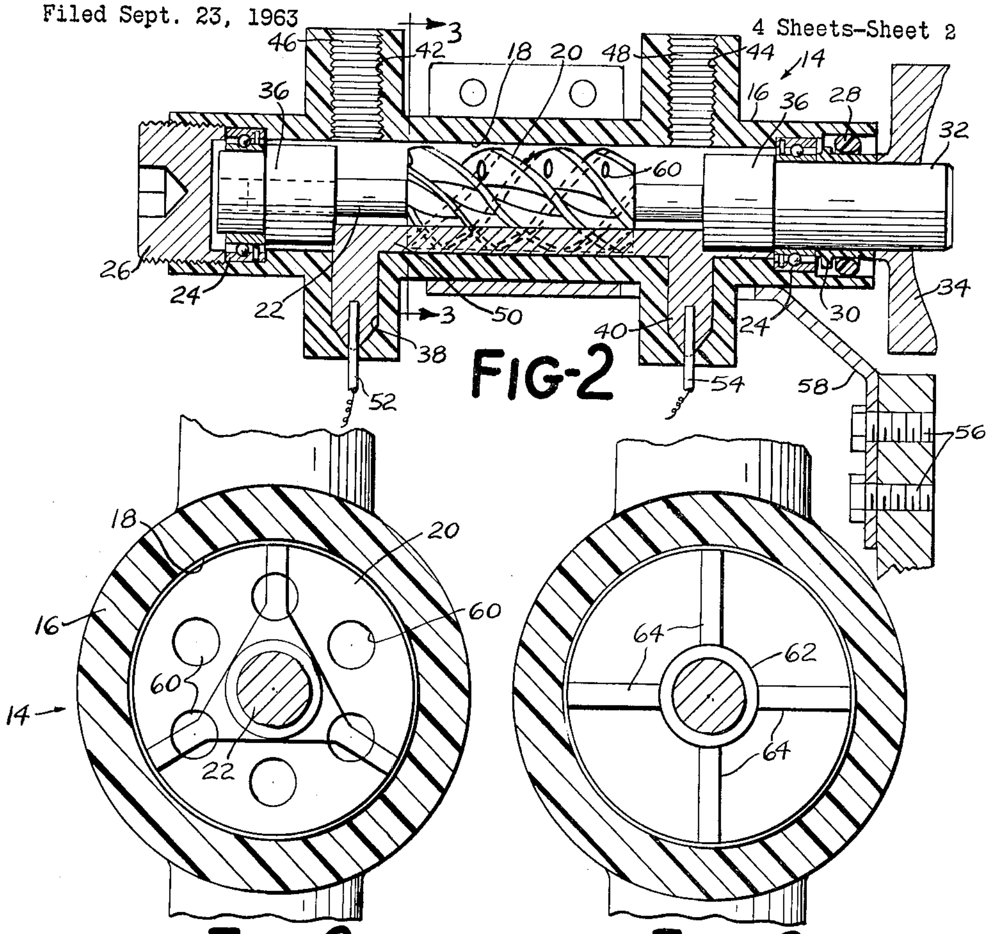
FIGURE 2 is a sectional view indicated by line 2—2 on FIGURE 1 and showing one modification of a switch according to my invention.
FIGURE 3 is a cross sectional view through the switch and is indicated by line 3—3 on FIGURE 2.
FIGURE 6 is a sectional view indicated by line 6—6 on FIGURE 5.

Reference to FIGURES 2 and 3 will show one form which a switch according to the present invention can take. In FIGURE 2 it will be seen that switch 14 has a body 16 of electrical insulating material. The body has a cylindrical bore 18 therein and mounted in the bore is a spirally fluted impeller member 20. Impeller member 20 includes a shaft portion 22, the ends of which are supported in anti-friction bearings 24. One end of bore 18 is closed by a threaded plug 26 screwed into the end of the bore and the other end thereof is provided with sealing means 28, which seal between bore 18 of body 16 and a bushing 30 carried on outwardly extending part 32 of shaft 22.

Part 32 is adapted for connection with rotating member 34 of the lathe so that the spirally fluted impeller is driven in rotation when the lathe operates and does not rotate when the lathe is stopped.

Shaft 22 may comprise enlarged portions 36 immediately inwardly of bearings 24 fitting relatively closely within bore 18. Some mercury may pass portions 36 to the bearings but it will serve as a lubricant and the bearings can otherwise run dry. Bearings 24 are preferably sealed type on their ends toward outer ends of the switch.

Immediately inwardly of enlarged portion 36 of shaft 22 are the pockets or cavities 38 and 40 formed in the switch body. These cavities or pockets may be formed in projects molded integrally with the switch body and which projects can thereafter be drilled out by availing of the excess holes 42 and 44 provided in the switch body directly opposite the said pockets, and which holes are internally threaded so that they can be sealed closed by suitable plugs 46 and 48 mounted therein.

The pockets or cavities are disposed downwardly with respect to bore 18 which is itself disposed horizontally and this permits a body of mercury 50 to be placed within the switch body and which body of mercury will find the lower portion of bore 18 and extend as a single continuous unbroken body form from cavity 38 to cavity 40.

This body of mercury is availed of for effecting electric connection between the wires of electrodes 52 and 54 extending into the pockets or cavities from outside the switch body. These wires or electrodes form the means for effecting electrical connection with the switch and entirely eliminates the necesity for slip rings and brushes or other sliding contact elements.

It will be noted that the switch body is non-rotatable and is mounted on a stationary part 56 of the machine tool as by a bracket 58 so that the body is substantially supported in its horizontal position while the spirally fluted impeller is free to rotate therein.

The spirally fluted impeller 20 dips into the body of mercury and runs inside body 18 of the switch body with a relatively small clearance. The clearance may, for example, be from ten to thirty thousandths on the radius.

The ribs of the impeller are furthermore axially apertured as indicated by the holes 60 therein and these holes are distributed about the impeller 20 as will be seen in FIGURE 3 so that in any rotated position of the impeller at least one aperture in each rib dipping into the body of mercury will be below the normal level of the mercury in the switch body. To this end the apertures 60 are formed in axial rows extending through the ribs.

In operation, when impeller 20 is not rotating the body of mercury flows by gravity to the bottom of bore 18 and is distributed uniformly therealong and forms a continuous unbroken electrically conductive body extending between electrodes 52 and 54. Upon rotation of impeller 20, however, said impeller acts as a pumping element and pushes the mercury toward one end of bore 18 and this will interrupt the continuity of the body of mercury and thereby interrupt the electrical connection of electrode 52 with electrode 54.

The appearance of the switch at the time that the body of mercury is interrupted is shown somewhat diagrammatically in FIGURE 4 which illustrates the condition which obtains for one direction of rotation of impeller 20. For the opposite direction of rotation for the impeller 20 the mercury would, of course, be pushed or pumped toward the opposite end of bore 18, and this would also serve to interrupt the continuity of the body of mercury and open the switch.

I have found the switch to be cleanly opened at relative low switch speeds and to remain open during high switch speeds. I have found further that the closing of the switch when the impeller comes to a halt can be regulated by controlling the clearance of the impeller within the bore 18 and by controlling the sizes of the apertures 60. The smaller these elements are the longer it takes for the switch to close, whereas, the larger they are the more rapidly the switch will close when it comes to a halt. The switch has a long life and is economical to manufacture because substantially all of the parts thereof, with the exception of the bearings, can be molded and assembled substantially without machine work.

Figure 5:
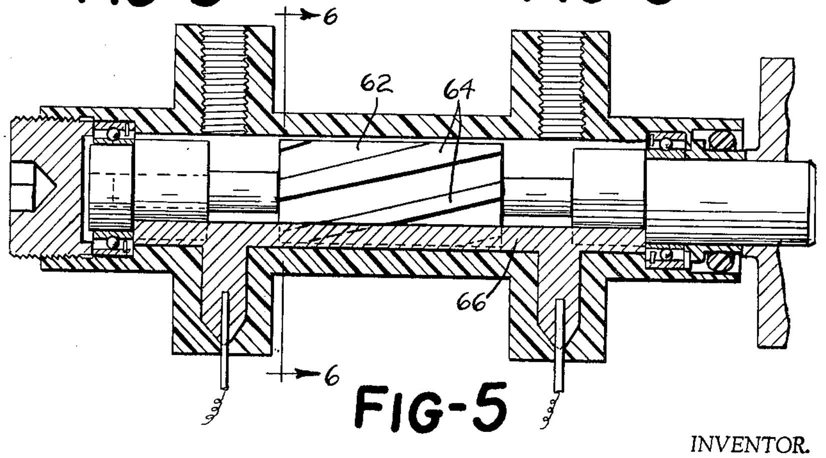
FIGURE 5 is a longitudinal sectional view through a modified form of the switch.

In FIGURES 5 and 6 there is shown a modified arrangement wherein the impeller 62 consists of a plurality of ribs 64 extending longitudinally from end to end thereof, but at a considerably greater pitch than the ribs of impeller 20 of the FIGURES 2 and 3 modification. It will be appreciated, however, that both the impeller 20 shown in FIGURE 2 and the impeller 62 shown in FIGURE 5 are generally similar in that each includes segments disposed at a lead angle relative to the rotor axis. More particularly, these segments are constituted by the flutes or ribs on impeller 20 (FIGURE 4) and the rib 64 on the impeller 62 (FIGURE 5). In each case, these ribs or flutes are disposed at an acute lead angle to the axis of rotation of the corresponding rotor.

Inasmuch as the pitch of the ribs in FIGURE 5 is substantially increased over those of FIGURE 2, it is not necessary to provide the ribs with apertures, but instead, the body of mercury 66 will join directly through one or more of the flutes between the ribs.

The modification of FIGURES 5 and 6 would lend itself well to be used with a machine which started and stopped quickly and would not require the delay means in closing described above in connection with the FIGURES 2 and 3 modification. The switch of FIGURES 5 and 6, similarly to FIGURES 2 and 3, is also bi-directional and will operate equally well in either direction of rotation.

Figure 7:
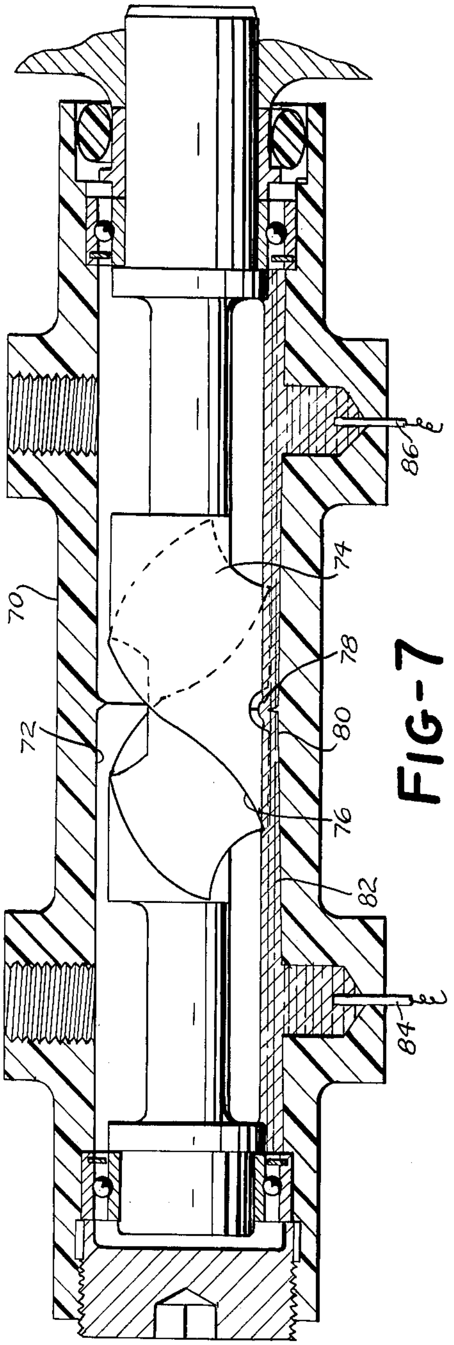
FIGURE 7 is a longitudinal sectional view through still another modification of my invention.

FIGURE 7 shows a switch arrangement wherein switch body 70 has a cylindrical bore 72 extending therethrough in which is mounted a switch rotator or impeller 74. Rotator or impeller 74 has a single groove 76 spirally thereabout and in the center of the land area between the ends of the groove is a notched region 78 adapted for receiving a rib 80 formed in the bore 72 and projecting radially inwardly therefrom. The switch bore contains a body of mercury 82 which, as will be seen in FIGURE 7, effects connection of electrode 84 with electrode 86 when the rotator is not rotating.

Figure 8:
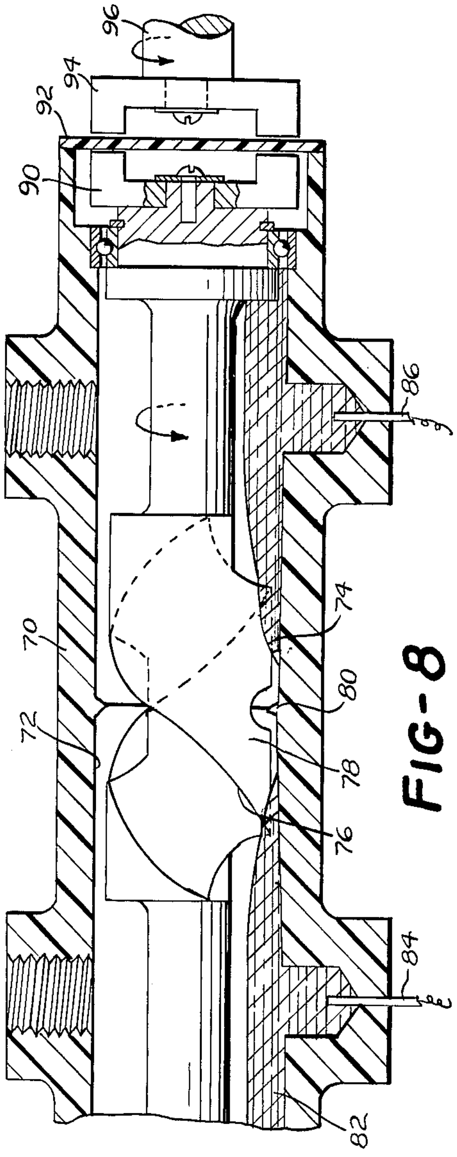
FIGURE 8 is a view like FIGURE 7 but shows the conditions which obtain within the switch when the switch is rotating and also showing a modified driving arrangement for the switch that permits the switch to be completely sealed.

When the rotor of the FIGURE 7 modification rotates, the mercury is impelled toward one end of the cavity and the body of mercury is interrupted in the region of the rib 80 shown in FIGURE 8. This will obtain for either direction of rotation of the rotor.

FIGURE 8 also shows how the rotor could be provided with a magnetic driver 90 sealed inside the switch within the sealing cover plate 82. Another magnetic element 94 outside plate 92 is driven by shaft 96 and this will cause rotation of the rotor. Either one or both of the elements 90, 94 could be in the form of a permanent magnet and the other be formed of magnetic material. The construction of FIGURE 8 permits the switch to be completely sealed so that there is absolutely no chance of leakage of mercury therefrom.

Figure 9:
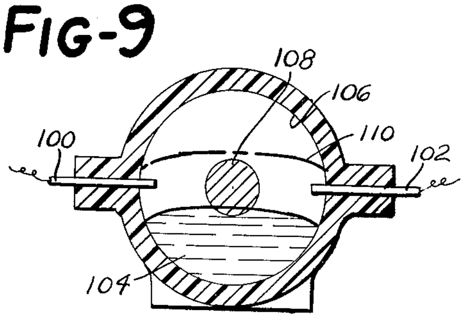
FIGURE 9 is a transverse sectional view taken through one end of a rotary zero speed switch showing how the switch could be constructed so as to be normally open and to be closed when rotating.

In FIGURE 9 there is shown an arrangement wherein at the end of the casing of any of the switch arrangements heretofore described, there is arranged a pair of electrodes 100, 102. These electrodes are normally not inter-connected by the body of mercury 104 in the cavity 106 of the switch body. However, upon rotation of the rotor 108 the mercury will be impelled toward the end of the cavity and will rise to the level indicated by the dash line 110, thereby to inter-connect the electrodes. With a pair of electrodes at each end of the cavity in about the same longitudinal region of location of the electrodes 52, 54 in the FIGURE 2 arrangement and the electrodes 84, 86 of the FIGURE 7 arrangement, a normal open switch would be provided which would close in response to rotation of the rotor in either direction.

Figure 10:
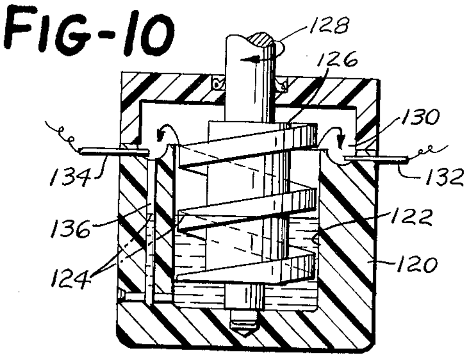
FIGURE 10 is a vertical sectional view through a modified form of the switch which can be arranged to rotate on a vertical axis, and which is of a normally open type.
Figure 11:
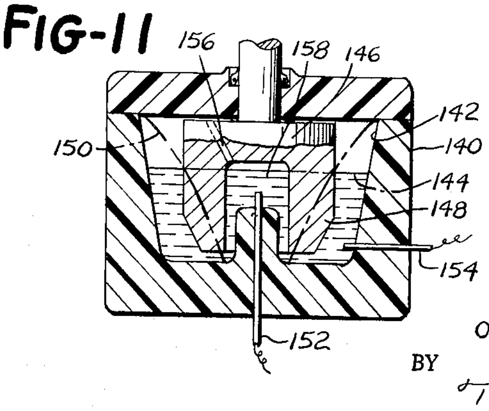
FIGURE 11 is another view of a vertical switch which is of the normally closed type.

The switches heretofore described are mounted for rotation of the rotor on a horizontal axis, but the present invention also contemplates mounting of the switch for rotation of the rotor on a vertical axis and switches of this nature are illustrated in FIGURES 10 and 11. In FIGURE 10 switch body 120 has a cavity 122 therein containing a body of mercury 124. A screw type rotor 126 extends vertically downwardly into the body of mercury. Upon rotation of the rotor in the direction of arrow 128, the mercury will be lifted upwardly by the rotor and will spill out laterally therefrom into annular groove provided in the body of the switch. Electrodes 132, 134 extend into this annular cavity and are electrically interconnected by the mercury supplied to the cavity by rotation of the rotor. The annular cavity is drained by passage means 136 which is so dimensioned that the mercury will drain from the cavity through this passage at a rate less than the rate at which the mercury is supplied to the cavity by the rotor, so that whenever the rotor is rotating, the switch is closed but will open after the rotor halts.

The switches heretofore described have all employed a screw type impeller, but in FIGURE 11, I show how another type impeller could be employed. In FIGURE 11 switch body 140 has a cavity 142 containing a body of mercury 144 into which the vertically arranged rotary impeller 146 dips. This impeller has substantially radial blade means 148 so that when the impeller rotates, the body of mercury will form a substantially annular ring about the inside of the cavity as represented by dot dash line 150. When the rotor is not rotating the body of mercury will interconnect electrodes 152 and 154, whereas when the rotor is rotating the electrodes are disconnected from each other. A passage 156 formed in the top of the rotor prevents gas from being entrapped in the central cavity 158 of the rotor and also controls the rate at which the mercury will flow back upwardly into the rotor after rotation of the rotor has stopped.

The FIGURE 11 arrangement is effective in both directions of rotation of the rotor.

In the foregoing it will be seen that the present invention provides an arrangement in which a rotary switch can be constructed having no slip rings or the like and employing a body of flowable electrically conductive material that can be moved by the rotation of a rotor in the switch body so selectively to complete or interrupt a circuit in which the switch is connected.

It will be understood that this invention is susceptible to modification in order to adapt it to different usages and conditions; and accordingly, it is desired to comprehend such modifications within this invention as may fall within the scope of the appended claims.

I claim:

1. In a brushless zero speed switch; a stationary body having a horizontal bore therein, terminals arranged in axially spaced relation extending from outside said body into said bore and insulatingly supported by said body, a body of mercury in said bore normally electrically interconnecting said terminals, a rotor in said bore rotatably supported on the axis of the bore, said bore being sealed at its opposite ends to retain the mercury therein, said rotor having at least a portion between said terminals having flute means spiralling therealong in the longitudinal direction whereby the rotor will act as an impeller when rotating and pump the mercury axially toward one end of the bore and thereby interrupt the continuity of the body of mercury to break the circuit between said terminals, and means for rotating said rotor, said rotor and said bore being configurated to provide return passageways for said mercury, whereby when said rotor is rotated below a predetermined speed said mercury forms a unitary body establishing a conductive electrical path between said electrodes.

2. In a brushless zero speed switch; a stationary body having a horizontal bore therein, terminals arranged in axially spaced relation extending from outside said body into said bore and insulatingly supported by said body, a body of mercury in said bore normally electrically interconnecting said terminals, a rotor in said bore rotatably supported on the axis of the bore, said bore being sealed at its opposite ends to retain the mercury therein, said rotor having at least a portion between said terminals having flute means spirally therealong in the longitudinal direction whereby the rotor will act as an impeller when rotating and pump the mercury axially toward one end of the bore and thereby interrupt the continuity of the body of mercury to break the circuit between said terminals, and means for rotating said rotor, said rotor in the region thereof outwardly from said terminals having sections thereof fitting said bore with a small clearance, the portions of said rotor intermediate said last named sections and said bore being configurated to provide return passageways for said mercury, whereby when said rotor is rotated below a predetermined speed said mercury forms a unitary body establishing a conductive electrical path between said electrodes.

3. In a brushless zero speed switch; a stationary body having a horizontal bore therein, terminals arranged in axially spaced relation extending from outside said body into said bore and insulatingly supported by said body, a body of mercury in said bore normally electrically interconnecting said terminals, a rotor in said body rotatably supported on the axis of the bore, said bore being sealed at its opposite ends to retain the mercury therein, said rotor having at least a portion between said terminals having flute means spiralling therealong in the longitudinal direction whereby the rotor will act as an impeller when rotating and pump the mercury axially toward one end of the bore and thereby interrupt the continuity of the body of mercury to break the circuit between said terminals, and means for rotating said rotor comprising a shaft on the rotor extending out one end of said switch body, said rotor and said bore being configurated to provide return passageways for said mercury, whereby when said rotor is rotated below a predetermined speed said mercury forms a unitary body establishing a conductive electrical path between said electrodes.

4. A brushless zero speed switch comprising a stationary body having an elongated, horizontally disposed bore therein, two electrical terminals extending through said body into said bore, said electrical terminals being spaced axially along said bore, a body of mercury in said bore, a rotor in said bore, means rotatably supporting said rotor on the axis of said bore, said rotor including segments disposed at a lead angle relative to the axis of said rotor, said segments being effective to pump said mercury axially of said bore when said rotor is rotated, said mercury being effective to bridge said terminals and establish a conductive path therebetween when said rotor is at rest, said rotor and said bore being configurated to provide passageways for the return of said mercury in the opposite direction, said mercury being axially pumped toward one end of said bore to interrupt the conductive path between said terminals within said switch whenever the speed of said rotor exceeds a predetermined amount.

5. A brushless zero speed switch comprising a stationary body having an elongated, horizontally disposed bore therein, two electrical terminals extending through said body into said bore, said electrical terminals being spaced axially along said bore, a body of mercury in said bore, a rotor in said bore, means rotatably supporting said rotor on the axis of said bore, said rotor including segments disposed at a lead angle relative to the axis of said rotor, said segments being effective to pump said mercury axially of said bore when said rotor is rotated, said mercury being effective to bridge said terminals and establish a conductive path therebetween when said rotor is at rest, said rotor having apertures therein for the return of said mercury in the opposite direction, said mercury being axially pumped toward one end of said bore to interrupt the conductive path between said terminals within said switch whenever the speed of said rotor exceeds a predetermined amount.

6. A brushless zero speed switch comprising a stationary body having an elongated, horizontally disposed bore hterein, two electrical terminals extending through said body into said bore, said electrical terminals being spaced axially along said bore, a body of mercury in said bore, a rotor in said bore, means rotatably supporting said rotor on the axis of said bore, said rotor including segments disposed at a lead angle relative to the axis of said rotor, said segments being effective to pump said mercury axially of said bore when said rotor is rotated, said mercury being effective to bridge said terminals and establish a conductive path therebetween when said rotor is at rest, said rotor having apertures therein and having peripheral clearance with said bore for the return of said mercury in the opposite direction, said mercury being axially pumped toward one end of said bore to interrupt the conductive path between said terminals within said switch whenever the speed of said rotor exceeds a predetermined amount.

7. A bi-directional brushless zero speed switch comprising a stationary body having an elongated, horizontally disposed bore therein, two electrical terminals extending through said body into said bore, said terminals being axially spaced along said bore, a body of mercury in said bore, a rotor in said bore, means rotatably supporting said rotor on the axis of said bore, said rotor including segments disposed at a lead angle relative to the axis of said rotor, said segments being effective to pump said mercury axially of said bore when said rotor is rotated, said mercury being pumped axially of said bore by rotation of said rotor, said rotor and said bore being configurated to provide passageways for the return of said mercury in the opposite direction, said mercury being axially pumped toward an end of said bore to interrupt the conductive path between said terminals within said switch whenever said rotor is rotated in either direction above a preselected speed.

References Cited by the Examiner

UNITED STATES PATENTS

| | | | |
|---|---|---|---|
| 688,068 | 12/1901 | Cunningham | 200—32 |
| 2,164,991 | 7/1939 | Ingres | 200—80 |
| 2,438,067 | 3/1948 | Luhn | 200—32 |
| 2,444,687 | 7/1948 | Widakowich | 200—32 |
| 2,699,475 | 1/1955 | Gardes | 200—80 |

KATHLEEN H. CLAFFY, *Primary Examiner.*

ROBERT K. SCHAEFER, *Examiner.*